United States Patent [19]
Logie

[11] 3,974,610
[45] Aug. 17, 1976

[54] PARTITION SYSTEM

[75] Inventor: Charles F. Logie, Spring Lake, Mich.

[73] Assignee: American Store Equipment Corporation, Muskegon, Mich.

[22] Filed: Jan. 29, 1975

[21] Appl. No.: 544,973

[52] U.S. Cl. ........................... 52/285; 52/584; 52/585; 52/753 E; 52/754; 85/43; 312/263
[51] Int. Cl.² ..................................... E04B 1/48
[58] Field of Search .............. 52/584, 585; 403/248, 403/292; 312/263

[56] References Cited
UNITED STATES PATENTS

| | | | |
|---|---|---|---|
| 297,153 | 4/1884 | Muir | 403/292 |
| 642,677 | 2/1900 | Childs | 403/296 |
| 724,897 | 4/1903 | Lee | 403/298 |
| 916,553 | 3/1909 | Heap | 4/237 |
| 1,066,421 | 7/1913 | Russell | 403/296 |
| 1,094,900 | 4/1914 | Hoit | 403/264 |
| 1,110,621 | 9/1914 | Gabel | 403/231 |
| 1,458,563 | 6/1923 | Walker | 52/204 |
| 1,919,702 | 7/1933 | Murphy | 52/585 |
| 1,972,475 | 9/1934 | Davison | 72/46 |
| 2,133,204 | 10/1938 | Mox | 52/585 |
| 2,242,537 | 5/1941 | Moore | 5/296 |
| 2,272,507 | 2/1942 | Bullard | 403/169 |
| 2,305,063 | 12/1942 | Collins | 5/296 |
| 2,478,088 | 8/1949 | Causey | 403/292 |
| 2,540,468 | 2/1951 | Anderson | 52/585 |
| 2,576,511 | 11/1951 | Jewett | 16/1 |
| 2,592,634 | 4/1952 | Wilson | 72/107 |
| 2,746,769 | 5/1956 | Hoogendoorn | 280/287 |
| 2,747,236 | 5/1956 | French | 52/494 |
| 2,815,997 | 12/1957 | Karb | 52/753 |
| 3,007,146 | 10/1961 | Fletcher et al. | 340/174.1 |
| 3,285,633 | 11/1966 | Houvener | 403/334 |
| 3,313,199 | 4/1967 | Houvener et al. | 85/66 |
| 3,352,075 | 11/1967 | Werner et al. | 52/239 |
| 3,534,517 | 10/1970 | Kann | 52/239 |
| 3,537,736 | 11/1970 | Kroopp | 52/584 |
| 3,567,260 | 3/1971 | Norris | 52/584 |
| 3,653,698 | 4/1972 | Jenner | 52/584 |
| 3,798,860 | 3/1974 | Mason | 52/285 |

FOREIGN PATENTS OR APPLICATIONS

| | | | |
|---|---|---|---|
| 1,491,842 | 8/1966 | France | 52/755 |
| 1,380,911 | 10/1964 | France | 312/263 |
| 42,117 | 4/1887 | Germany | 52/754 |
| 345,893 | 2/1920 | Germany | 52/754 |
| 1,806,019 | 5/1970 | Germany | 403/292 |
| 599,620 | 11/1959 | Italy | 52/755 |
| 683,562 | 2/1965 | Italy | 52/583 |
| 431,886 | 9/1967 | Switzerland | 52/586 |
| 1,133,931 | 11/1968 | United Kingdom | 403/292 |
| 9,329 | 6/1884 | United Kingdom | 52/585 |
| 133,203 | 10/1919 | United Kingdom | 52/756 |
| 490,417 | 8/1938 | United Kingdom | 52/755 |
| 800,967 | 9/1958 | United Kingdom | 52/583 |
| 1,059,967 | 2/1967 | United Kingdom | 52/753 E |

*Primary Examiner*—Ernest R. Purser
*Assistant Examiner*—Leslie A. Braun
*Attorney, Agent, or Firm*—Price, Heneveld, Huizenga & Cooper

[57] ABSTRACT

A panel unit and panel assembly wherein a panel, of the type useful for partitioning a room into smaller areas, is joined to another along abutting surfaces which are substantially exactly aligned with one another. Each panel includes an aperture in its abutting surface for receiving a connecting pin. Each aperture is offset toward one of the panel side surfaces of its panel a distance equal to one-half the difference in width or diameter between the pin and receiving apertures. When the connecting pin is secured in the apertures, the abutting panel surfaces are aligned regardless of whether the said one panel surfaces toward which the apertures are respectively offset are on the same or opposite sides of the final panel assembly.

8 Claims, 4 Drawing Figures

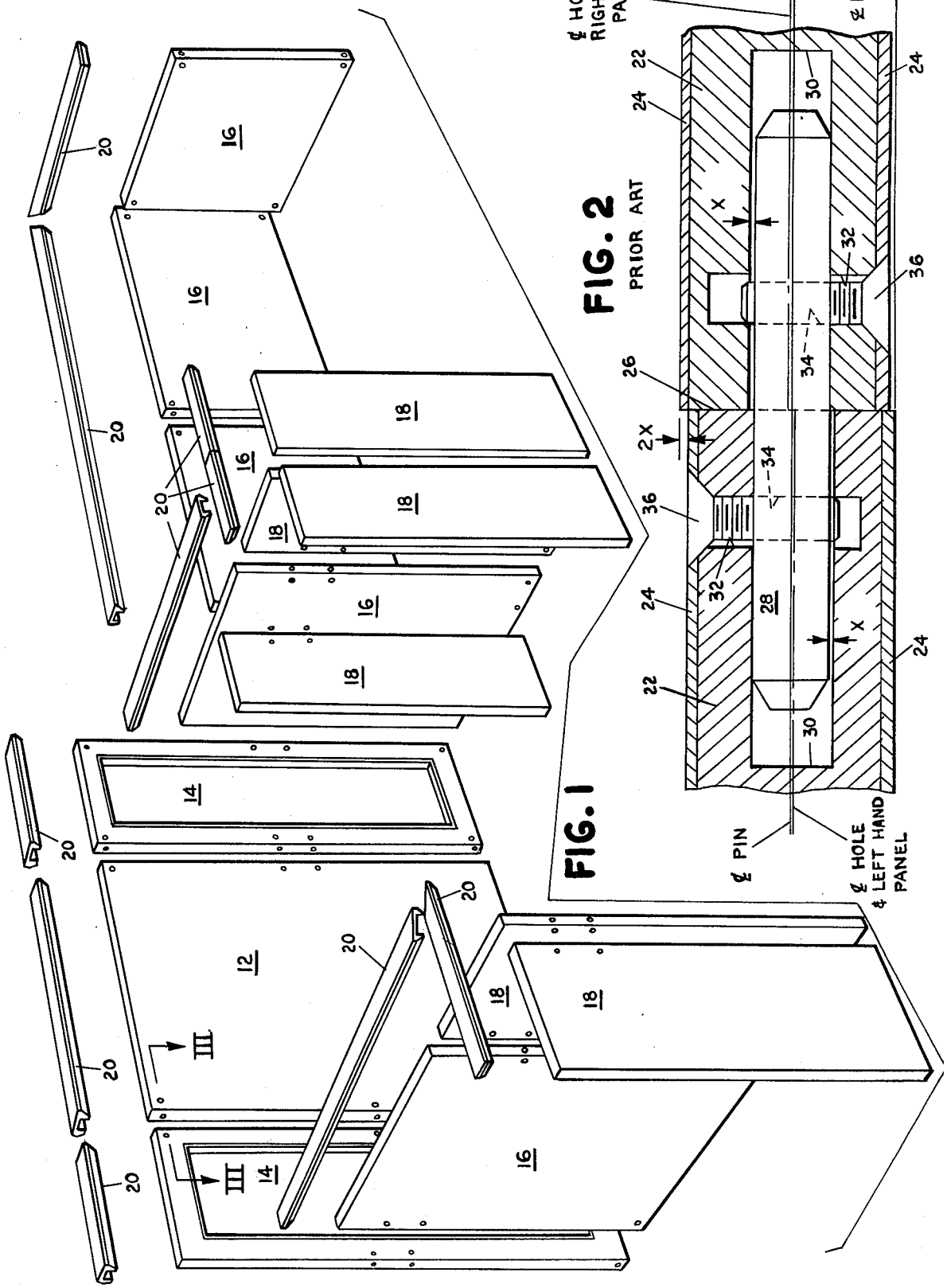

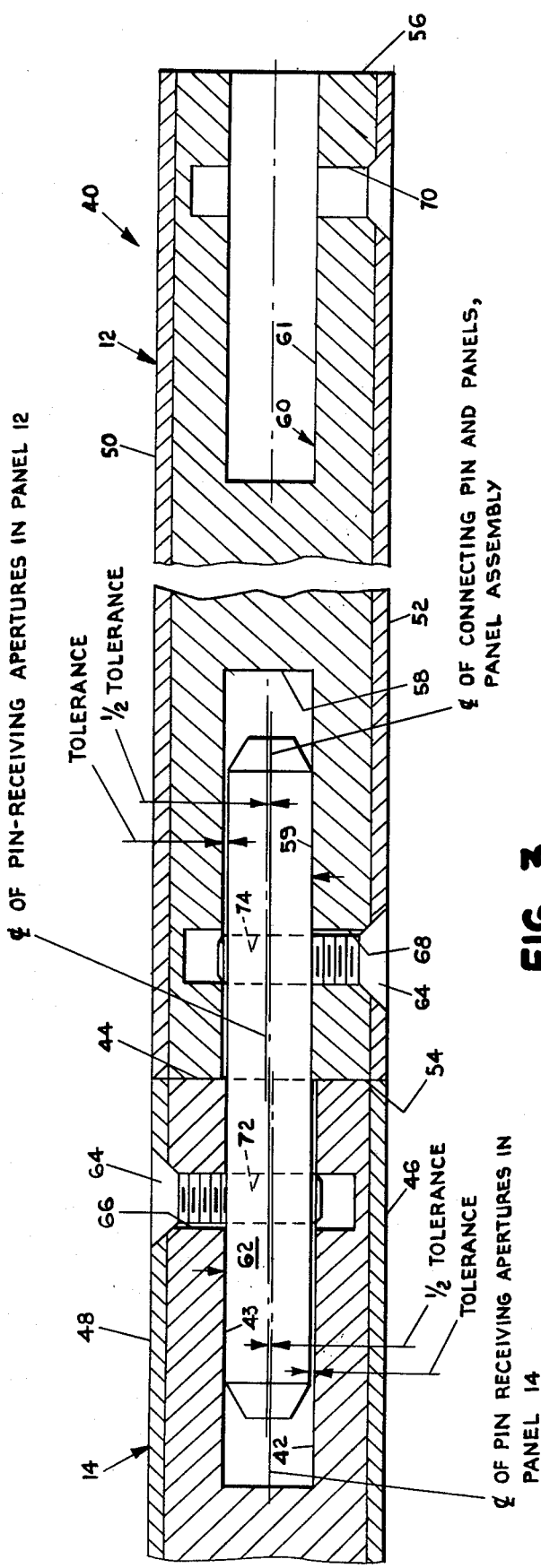
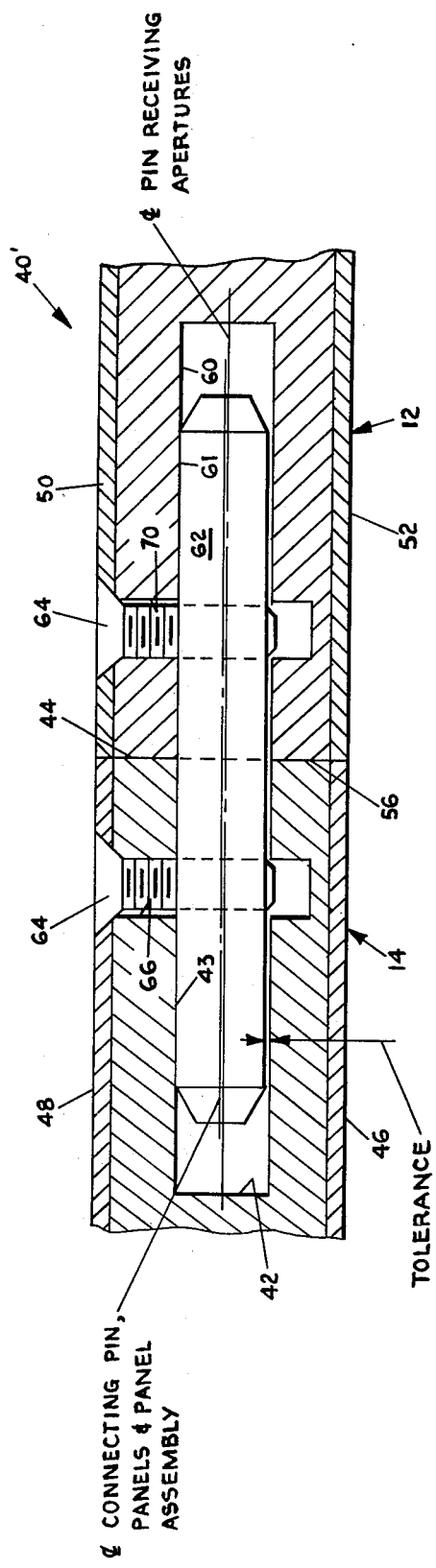

PARTITION SYSTEM

BACKGROUND OF THE INVENTION

The present invention relates to portable partition systems used in partitioning larger room areas into smaller spaces. One such system is described in my U.S. Pat. No. 3,884,002, issued May 20, 1975, entitled "Partition System" and invented by myself. In that application, a system is described for fastening vertically upstanding partition panels together, and especially large, bulky, heavy partition panels. A connecting pin extends between pin-receiving apertures formed in the end surfaces of two panels with fastening screws extending normally outwardly through screw holes in the side surfaces of the panels and engaging the connecting pin. The fastening screws include tapered heads which engage offset apertures through the side surfaces for wedging the panels tightly toward one another to eliminate any cracks and spaces therebetween and to secure one panel tightly to the other.

This system worked exceptionally well under most circumstances. However, a problem was encountered every time partitions were abutted with the screw holes disposed on opposite sides of the partition rather than on the same side. The outside surfaces of the two panels were not flush or coextending and were, in fact, offset and misaligned from one another. Such misalignment caused a considerable problem in the assembly of such panels because it resulted in an unsightly, unaesthetic seam or joint in the finished partition system. Even when greater care was taken to ensure that the pin-receiving apertures were precisely on center, the problem was not solved.

SUMMARY OF THE INVENTION

I have now discovered that, quite to my surprise and that of others, the problem is, in fact, caused by a combination of the need for tolerances and the care taken to ensure proper centering of the pin-receiving apertures. Quite contrary to what would seem at first logical, the solution to the problem lies not in proper centering, but in deliberately offsetting the pin-receiving apertures towards one side or the other of the panels or partitions. Specifically, the pin-receiving aperture is offset toward one of the two side surfaces of the panel a distance equivalent to one-half the tolerance between the connecting pin and the pin-receiving aperture. While one might expect this to result in panel misalignment either when the panels are aligned with screw holes on the same side or alternately when they are on opposite sides, in fact, substantial alignment and flush fit results regardless of whether the screw holes are on the same side of the final panel assembly or are on opposite sides of that assembly.

These and other objects, advantages, and features of the invention will become more apparent from a study of the following description taken in conjunction with the drawings.

BRIEF DESCRIPTION OF THE DRAWINGS

FIG. 1 is a perspective, exploded illustration of the type of panel or partition system with which the present invention is especially useful;

FIG. 2 is a fragmentary, sectional illustration of the prior known method of assembly wherein the pin-receiving apertures are centered in the panel illustrating the resulting misalignment;

FIG. 3 is a sectional view of the panel assembly of the present invention taken along plane III-III of FIG. 1 illustrating the offset pin-receiving apertures and the connecting pin secured therein wherein the screw holes, and the side surfaces toward which the apertures are offset, are on opposite sides of the panel assembly; and FIG. 4 is a fragmentary, sectional view of a panel assembly of the present invention similar to that shown in FIG. 3 but wherein the screw holes, and the side surfaces toward which the pin-receiving apertures are offset, are on the same side of the final panel assembly.

DESCRIPTION OF THE PREFERRED EMBODIMENT

Referring to FIG. 1, the typical movable wall partition system 10 with which the present invention is especially useful is shown in a normal arrangement including four sizes of movable, upstanding partitions or panels 12, 14, 16, and 18. Referring now to FIG. 2, the prior known pin connection system for the panels, fully described in my copending patent application Ser. No. 341,360 filed Mar. 15, 1973, entitled "Partition System" invented by myself, the disclosure of which is incorporated by reference herein, will be briefly described for understanding the present invention. Each of the partitions or panels 12-18 includes an inner core 22 of wood, composite material, or the like as well as outer side surface decorative layers or sheets 24 of wood, veneer, steel, plastic, or the like. The panels, for example panels 12 and 14 from FIG. 1, are joined together along end-abutting surfaces 26 via an elongated cylindrical connecting pin 28. End surfaces 26 are typically normal or perpendicular to side surfaces 24 on each panel. Pin 28 is received in connecting pin-receiving apertures 30 which extend into the core 22 of each panel from end surfaces 26. Apertures 30 are typically sized larger than the transverse width or diameter of cylindrical pin 28 in order to provide a predetermined tolerance allowing the pin to be slipped easily thereinto. A typical tolerance (dimension X in FIG. 2) in the prior art is 1/32 of an inch.

In order to secure each end of the pin 28 in its respective pin-receiving aperture 30, each panel includes a screw-receiving aperture or screw hole 32 extending normally to the center line of aperture 30. Apertures 32 extend through one of the two side surfaces 24, through and slightly past aperture 30, but not completely through the entire panel. Further, connecting pin 28 includes threaded apertures 34 extending along diameters thereof one at either end of the pin and spaced to be in registry with apertures 32. A threaded, flathead screw 36 is received through aperture 32 and threaded into aperture 34 and pin 28 such that the two panels are secured tightly together.

As is illustrated in FIG. 2, the prior known systems utilize pin-receiving apertures 30 which, as is logical, were exactly centered on the centerline of their respective panels. The panels are often assembled with the apertures 32 and securing screws 36 entering their respective panels from opposite sides of the final panel assembly (see FIG. 2). As I discovered, because of the tolerance between the connecting pin and apertures 30, assembly in this manner produces an unsightly and unaesthetic misalignment of the end surfaces and side surfaces such that the side surfaces 24 do not lie in the same plane and are not flush.

In the specific example of FIG. 2, when the tolerance between the skin and aperture was 1/32, indicated as dimension X in FIG. 2, of an inch in each panel, the resulting misalignment when the apertures were exactly centered on the panel centerlines was 1/16 of an inch indicated as 2X in FIG. 2. Such misalignment occurred even though the centerline of the connecting pin was centered with respect to the entire panel assembly but not with respect to the panels individually as is illustrated in FIG. 2.

As shown in FIGS. 3 and 4, the present invention allows assembly of the substantially equivalent width panels to produce a flush fit of the side surfaces when screws 64 are on opposite sides (FIG. 3) or the same side (FIG. 4). In FIG. 3, assembly 40 includes panel 14 having a right circular, cylindrical, pin-receiving aperture 42 bored perpendicularly into end surface 44. Although only one end of panel 14 is shown, it will be understood that its opposite end is similar and may also include a pin-receiving aperture in that opposite end located on the same line as aperture 42. Panel 14 also includes side surfaces 46 and 48 extending substantially perpendicularly to end surface 44 such that surfaces 46, 48 are substantially parallel with one another.

Similarly, the right-hand panel 12 in FIG. 3 includes generally parallel side surfaces 50 and 52 as well as end surfaces 54 and 56 extending transversely between the side surfaces. End surfaces 54, 56 are substantially perpendicular to the parallel side surfaces 50 and 52. A right circular cylindrical pin-receiving aperture 58 is bored perpendicularly to end surface 54 into the core of panel 12 while a similar right circular cylindrical pin-receiving aperture 60 is bored in the remaining end 56. Apertures 58, 60 have a common cylindrical axis as shown in FIG. 3.

Panels 12 and 14 are secured together by an elongated right circular cylindrical connecting pin 62 substantially identical with the connecting pin 28 shown in FIG. 2. Pin 62 is secured in each aperture 42, 58 via flathead screws 64 received through apertures 66 and 68 in panels 14 and 12, respectively. Screw-receiving apertures 66, 68 extend through apertures 42, 58 perpendicularly to the centerlines of the respective pin-receiving apertures and slightly therepast to allow clearance for the end of screws 64. Screws 64 are received in threaded apertures 72, 74 (FIG. 3) extending radially through connecting pin 62. Apertures 72, 74 are spaced to correspond to the spacing of apertures 66, 68. Likewise, the pin-receiving aperture 60 in the opposite end of panel 12 includes a screw-receiving aperture 70 extending normally to its axis for receipt of a screw 64 when necessary. Receiving apertures 42, 58, 60 have substantially equivalent diameters while connecting pin 62 has a diameter less than that of these pin-receiving apertures. The difference in diameter or transverse width of the pin and respective receiving holes is a tolerance allowing the pin to be easily inserted in the hole.

Instead of the pin-receiving apertures 42, 58, and 60 being exactly centered on the panel centerline, as was the case in prior assemblies as shown in FIG. 2, pin-receiving apertures 42, 58, and 60 have their axes offset toward one of the side surfaces of the respective panel by a distance equivalent to one-half the tolerance, i.e., one-half the difference in diameters or transverse width of pin 62 and the pin-receiving apertures. Thus, aperture 42 has its axis offset a distance equivalent to one-half the tolerance toward side surface 46 while pin-receiving apertures 58, 60, lying along a common axis, have their common axes offset a distance equivalent to one-half the stated tolerance toward side surface 50 of panel 12. Further, the pin-receiving apertures are offset toward the side surface which is opposite to the side surface through which the securing screws 64 extend. That is, apertures 42, 58, and 60 are offset respectively toward side surfaces 46 and 50 which are farthest away from the inside wall of the respective aperture against which the connecting pin 62 is tightly secured by securing screws 64. In FIG. 3, the connecting pin 62 is tightly secured by securing screws 64 against walls 43, 59.

As will now be apparent from FIGS. 3 and 4, panels 14 and 12 may be assembled with either end surface thereof abutting either end surface of the other panel and with side surfaces 46 and 52, including securing screws 64 extending therethrough, either on the same or opposite sides. In FIG. 3, panel 14 has securing screw 64 extending toward the opposite side. Screws 64 draw connecting pin 62 against walls 43 and 59 of apertures 42 and 58, respectively, such that the pin axis is exactly centered in the panel assembly and is midway between the offset axes of the apertures 42, 58. Hence, the side surfaces 48 and 50 are flush, parallel, and exactly aligned as are side surfaces 46 and 52.

As shown in FIG. 4 in embodiment 40', the panels are assembled with the side surfaces through which the securing screws 64 are received on the same side. End surface 56 abuts end surface 44 of panel 14 with connecting pins 62 extending from aperture 42 into pin-receiving aperture 60. Securing screws 64 extend through apertures 66 and 70 drawing the connecting pin tightly against the inside walls 43 and 61 of apertures 42 and 60, respectively. Accordingly, even though the centerline of pin 62 is offset a distance equal to the tolerance between the pin and pin-receiving apertures from the axes of the apertures 42 and 60, the pairs of surfaces 48, 50, and 46, 52 are exactly aligned and flush with one another as illustrated in FIG. 4.

Accordingly, the offset of the pin-receiving apertures toward one side surface of the panel in which they are formed, which side surface is farthest away from the inside aperture wall against which the connecting pin is secured when the panels are fastened together, results in finished panel assemblies having mating, flush, and exactly aligned side surfaces. This is true regardless of whether the side surface through which the securing screws are inserted are on the same or opposite sides of the final panel assembly. Each pin-receiving aperture is offset from the panel centerline a distance equal to one-half the tolerance between the pin-receiving apertures and connecting pins such that the total tolerance will be accommodated for by the two panels together when secured as shown in FIG. 3. As shown in FIG. 4, since the apertures themselves are aligned and offset an equal distance, the connecting pin will lie along the same inside wall of the two apertures.

While one form of the invention has been shown and described, other forms will now be apparent to those skilled in the art. Therefore, it will be understood that the embodiment shown in the drawings and described above is merely for illustrative purposes and is not intended to limit the scope of the invention which is defined by the claims which follow.

The embodiments of the invention in which an exclusive property or privilege is claimed are defined as follows.

1. A panel assembly having a pair of panels joined along abutting surfaces comprising a first panel having a centerline, a pair of generally opposite side surfaces and a first end surface extending generally transverse to both said centerline and said side surfaces; a second panel having a centerline, a pair of generally opposite side surfaces, and a second end surface extending generally transverse to both said second panel centerline and second panel side surfaces; a first aperture in said first end surface and a second aperture in said second end surface, said first and second apertures each having respective centerlines, being substantially parallel to the centerline of said first and second panels respectively and having substantially equivalent transverse dimensions; the transverse widths of said first and second end surfaces being substantially equal at least at the position of said first and second aperture centerlines; an elongated connecting pin received in and extending between said first and second apertures for securing said panels together with said end surfaces abutting one another; said pin having a uniform width less than said transverse width of said apertures to create a tolerance between said aperture and said pin of predetermined width; said centerline of said first aperture being offset from said centerline of said first panel toward one side surface of each first panel a distance equivalent to one-half said tolerance; said centerline of said second aperture being offset from said centerline of said second panel toward one side surface of said second panel a distance equivalent to one-half said tolerance; securing means in each panel for tightening said connecting pin against the wall of each of said apertures which is farthest away from the said one surface of that respective panel whereby when said panels are joined, said side surfaces on said panels are substantially aligned and flush with each other regardless of whether said panels are assembled with the said one side surfaces thereof on the same or opposite sides of said panel assembly.

2. The panel assembly of claim 1 wherein said connecting pin has an axis of elongation and an aperture extending transverse to said axis on either side of its medial centerline; an additional aperture in each panel extending generally transverse to the centerline of said first or second apertures respectively and between said respective first or second aperture and the other of said side surfaces of said first or second panel respectively; said securing means including fastening means received through each of said additional apertures and in each of said transverse pin apertures for securing said pin against said walls in said first and second apertures.

3. The panel assembly of claim 2 wherein each of said transverse pin apertures are threaded; said fastening means including threaded screws engaging said threaded pin aperture.

4. The panel assembly of claim 2 wherein said connecting pin is cylindrical; said first and second apertures being cylindrical holes in said respective end surfaces.

5. The panel assembly of claim 4 wherein said pin is a circular cylinder with said transverse pin apertures extending radially therethrough; said first and second apertures being circular cylindrical holes in said respective panels.

6. The panel assembly of claim 1 wherein each of said panels includes an end surface opposite said first and second end surface respectively, said opposite end surfaces also extending generally transverse to said panel centerlines and said side surfaces and having substantially equivalent transverse widths, each of said opposite end surfaces including an additional connecting pin-receiving aperture, each additional pin-receiving aperture having a centerline substantially parallel to that of its respective panel, a transverse width substantially equivalent to the other pin-receiving apertures, and having its centerline offset from the centerline of its respective panel a distance equal to one-half said tolerance toward said one side surface of said respective panel; and securing means in each panel for tightening a connecting pin against the wall of each of said additional pin-receiving apertures which is farthest away from the said one side surfaces of the respective panels.

7. The panel assembly of claim 1 wherein said side surfaces are substantially perpendicular to said end surfaces on each panel, said first and second apertures extending normal to said respective end surfaces into said panels whereby said side surfaces are flush with one another when said panels are joined together.

8. The panel assembly of claim 1 wherein said panels are vertically upstanding, room partitioning panels.

* * * * *